United States Patent [19]

Anderson

[11] 3,823,365
[45] July 9, 1974

[54] METAL DETECTING APPARATUS HAVING IMPROVED GROUND-EFFECT IMMUNITY

[76] Inventor: Sherman D. Anderson, Rt. 3, Box 539, Klamath Falls, Oreg. 97601

[22] Filed: Jan. 24, 1973

[21] Appl. No.: 326,515

[52] U.S. Cl............................ 324/3, 324/41, 331/37
[51] Int. Cl............................................. G01v 3/10
[58] Field of Search............... 324/3, 41, 67; 331/37

[56] References Cited
UNITED STATES PATENTS

| 2,393,717 | 1/1946 | Speaker | 324/3 X |
| 3,355,658 | 11/1967 | Gardiner | 324/3 |
| 3,467,855 | 9/1969 | Rance | 324/3 |
| 3,471,772 | 10/1969 | Smith | 324/3 |
| 3,492,564 | 1/1970 | Baker | 324/3 |
| 3,510,677 | 5/1970 | Lister | 331/37 X |

OTHER PUBLICATIONS

Osborne, W. E., Transistorized Metal Locator, Electronics World, Mar. 1962, pp. 86–88.

Primary Examiner—Gerard R. Strecker
Attorney, Agent, or Firm—Klarquist, Sparkman, Campbell, Leigh, Hall & Whinston

[57] ABSTRACT

A BFO metal detector includes a support for carrying a search coil and plural compensating coils which prevent ground effects from changing the beat frequency output. The search coil forms part of a tuned circuit of a first oscillator while plural compensating coils form part of a tuned circuit of a second oscillator, the frequency of which is far enough removed from that of the first oscillator to prevent lock-in. The output of one or both of the oscillators is suitably converted to a frequency close enough to the remaining frequency to provide an audible beat.

16 Claims, 9 Drawing Figures

METAL DETECTING APPARATUS HAVING IMPROVED GROUND-EFFECT IMMUNITY

BACKGROUND OF THE INVENTION

A typical BFO or beat frequency oscillator metal detector includes a circularly shaped search coil constructed in a manner which permits its inductance to be influenced by the electrical properties of its surroundings. Thus, a metal object within a predetermined distance from the search coil may provide a change in permeability and hence a change in the search coil's inductance. The search coil is conventionally connected as a frequency determining element in an oscillator tuned circuit, and therefore the oscillator's output frequency will change when the search coil is positioned in close proximity to a metal object. The typical apparatus is also provided with a reference oscillator including a fixed inductance reference coil adapted to produce operation at a fixed frequency. Thus the reference coil is conventionally constructed and mounted in such a manner that prevents its inductance from being influenced by its surroundings. The outputs of the two oscillators are mixed in a nonlinear device producing a difference frequency or beat frequency output, with the oscillator frequencies being chosen such that the difference frequency is within an audible range for reproduction in a loud speaker or headphone. In practice, the user places a search coil in close proximity to the earth, and by audibly detecting changes in frequency as he moves the coil about, parallel to the earth's surface, the user is able to locate the presence of metal objects.

An operating problem is brought about by the electrical properties of the earth itself, such properties being quite different from those of air. Thus, the device as described becomes sensitive to the earth's surface, i.e., sensitive to the distance between the search coil and the earth's surface as the operator moves the coil about. A false output indication is produced unless the operator maintains the device at a fixed distance from a level ground surface.

SUMMARY OF THE INVENTION

In accordance with the present invention, an apparatus for detecting metal objects includes first and second oscillator means wherein a search coil is included in the tuned circuit of the first oscillator means. Instead of being isolated from the environment, the tuned circuit coil of the second oscillator means comprises a compensating coil and is adapted for concurrent movement relative to the ground or other environment with the search coil, resulting in a similar frequency shift for both oscillators as the said coils are moved toward and away from the general ground surface. As a result, the beat frequency remains substantially the same with such general movement and a false indication is avoided. However, when metal objects and the like are located closer to the axis of one coil or the other, i.e., closer to the search coil, an audible change in beat frequency output will result.

In accordance with an embodiment of the present invention, a plurality of compensating coils are employed in circuit with the second oscillator, e.g., with one physically located on each side of the search coil, whereby the problem of different spacing between coils and ground is avoided. Thus, a pair of compensating coils, one on each side of the search coil, may be connected to the same reference oscillator whereby the effect of ground spacing is averaged out should one coil on one side of the supporting apparatus become more closely spaced to the ground than the other. Therefore the operator does not have to maintain search and compensating coils in substantially parallel relation to the ground to achieve proper compensation.

In accordance with another feature of the present invention, the frequencies of the search oscillator and the reference or compensating oscillator are separated by an amount sufficient to avoid the lock-in frequently encountered when two oscillators in the same proximity are operated near the same frequency. The output of one or both of the oscillators is then converted to a frequency near enough to the remaining frequency to provide an audible beat note.

It is accordingly an object of the present invention to provide an improved apparatus for detecting metal objects, which apparatus is less sensitive to movements in its general environment than metal detecting apparatus of the prior art.

It is a further object of the present invention to provide an improved apparatus for detecting metal objects, which apparatus is rendered substantially immune to ground effects.

It is another object of the present invention to provide an improved apparatus for detecting metal objects, which apparatus employs search and compensating coils in close proximity for averaging out general environmental effects, while avoiding frequency lock-in between oscillators connected to the said coils.

It is another object of the present invention to provide an improved metal detector apparatus of the beat frequency oscillator type wherein lock-in between oscillators is avoided.

It is a further object of the present invention to provide an improved metal detector apparatus including search and compensating coils wherein angular disposition or differential location of the coils with respect to the ground surface or other environment is averaged to avoid an incorrect output indication.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DETAILED DESCRIPTION

Figures 1, 3, 4:
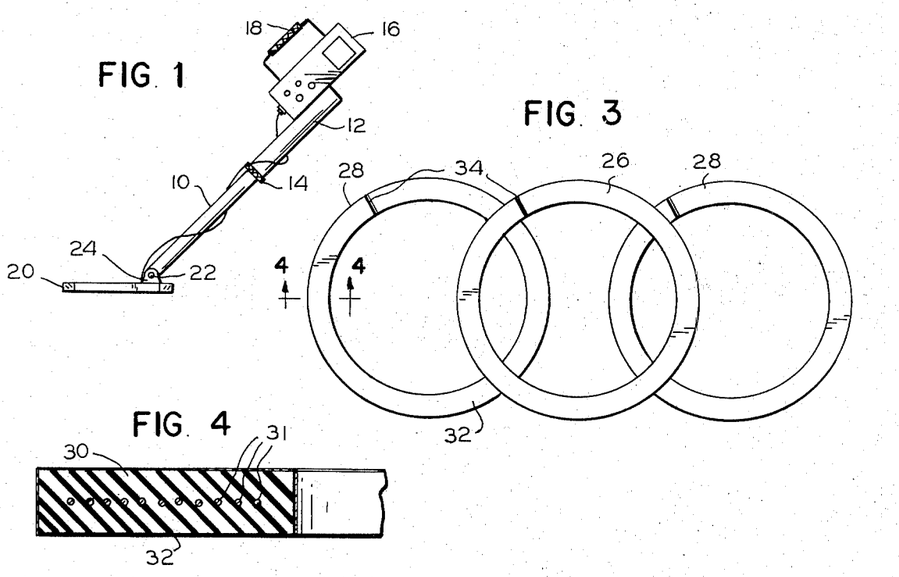
FIG. 1 is a side view of an apparatus according to the present invention for detecting metal objects.
FIG. 3 is a plan view of a coil assembly according to the present invention removed from its housing.
FIG. 4 is a cross-sectional view of a coil according to the present invention taken at 4—4 of FIG. 3.

Referring to the drawings and particularly to FIG. 1, metal detector apparatus according to the present invention includes a support rod comprising a first pole 10 adapted to be telescoped within a second hollow pole 12, the latter including a lockout 14 for securing the two poles together to provide a desired overall rod length. An electronic circuit enclosure cabinet 16 is secured to the upper end of pole 12 and is also provided with a carrying handle 18 by means of which the whole apparatus may be held and moved from place to place. A coil assembly housing 20 is pivotably secured to bottom pole 10 by means of a pin 22 extending between and through ears 24 mounted on the top of housing 20. The coil assembly housing 20 conveniently comprises an elongated and substantially planar molded plastic body, suitably approximately one inch in height by 14 inches long by seven inches wide, the assembly housing being more clearly illustrated in FIG. 2.

Figure 2:
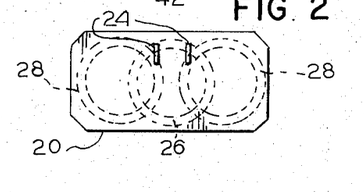
FIG. 2 is a top view of a coil assembly housing employed in the aforesaid apparatus.

Within the assembly housing are disposed a plurality of flat coils including a central or search coil 26 and a pair of compensating coils or compensating coil parts 28 disposed on either side of the search coil in overlapping relation therewith. Each of these coils is suitably embedded within the coil assembly housing in parallel relation to the flat upper and lower surfaces of the housing and hence in parallel relation to one another. The housing 20 is adapted to be supported from rod 10, 12 in a substantially horizontal position whereby all of the coils 26 and 28 will be located in approximately parallel relation to the ground. Thus the pivotal connection between elements 10 and 12 is relatively tight.

The search coil 26, which is primarily employed for locating metal objects, forms part of an oscillator circuit producing a beat frequency output with an oscillator including coils 28 in its tuned circuit. The location of coils 28 in the same housing with coil 26 compensates for the general presence of the ground surface, and as a result the instrument does not produce a false output indication because of "detection" of the ground by coil 26. Inasmuch as the ground surface is likely to be irregular and inasmuch as the accurate manual disposition of the coil assembly housing in parallel relation to the ground is difficult, the positioning of the compensating coils 28 on opposite sides of the search coil will also produce an advantageous balancing effect. Thus, if the coil assembly housing 20 becomes tilted relative to the ground surface about a horizontal axis parallel to the short sides of the housing, one of the coils 28 will be closer to the ground than coil 26, but the remaining coil 28 will be an equal distance farther away from the ground. A ground-parallel system is thereby simulated, to produce optimum compensation for the presence of the ground surface.

FIG. 3 illustrates the coil assembly as normally disposed within the coil assembly housing. It will be seen the coils are suitably disposed in overlapping relation with coil 26 located slightly above or below coils 28. An ideal arrangement would comprise coplanar coils, but the arrangement in FIG. 3 has been found advantageous with respect to coil size and overall compactness of the apparatus. Each of the coils suitably comprises a flat spiral, in a particular instance wound with No. 24 enamel covered copper wire, the coil having 10 to 20 turns. Individual turns are indicated at 31 in the FIG. 4 cross section. Each of the coils is embedded in a body of insulating material 30, this insulating material suitably comprising polyvinyl chrloride, polyester fiber glass or mineral filled polyester insulation. The insulating body 30 is suitably approximately ⅛ inch thick by approximately 0.55 inches between inside diameter and outside diameter as illustrated in FIG. 4. Body 30 may be covered with a conductive RF shield coating, suitably approximately 0.003 inches in thickness indicated by reference numeral 32. This RF shield coating electrostatically shields the coil from the changing stray capacitance effects of nearby objects. As illustrated in FIG. 3, the shield is broken at 34 to avoid a "shorted turn" which would degrade the Q of the tuned circuits in which the coils are connected.

Each of the overall coil bodies suitably has an outside diameter of approximately 5.8 inches, with the spacing between the center of coil 26 and the centers of each of the coils 28 suitably being approximately 3.6 inches. The coil bodies, even though overlapping, are insulated from one another. Thus, the RF shield coatings are suitably separated by a very thin layer of insulating material such as provided by a sheet of paper.

Figure 5:
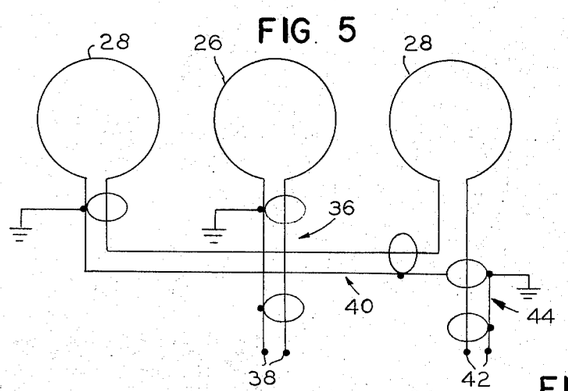
FIG. 5 is a schematic diagram illustrating typical connections between the coils of the FIG. 3 coil assembly.

The interconnection of the coils is illustrated in FIG. 5 wherein one turn, wide spaced coils are illustrated merely as a matter of convenience. The center coil is connected by means of a coaxial cable 36 to terminals 38, while compensating coils 28 are disposed in series by means of coaxial cable 40 and connected to terminals 42 via a coaxial cable indicated at 44. As will hereinafter more fully appear, the coils 28 are employed as part of the same tuned circuit and therefore really comprise parts of the same overall coil connected in series. Hence, the number of turns on each of the coils 28 can be less and their individual inductance suitably less than that of search coil 26. As a result, each of the coils 28 is less sensitive to the detection of searched-for objects, thus rendering search coil 26 relatively more sensitive. Although the coils are illustrated in series, it is equally possible to connect coils 28 in parallel, providing the number of turns thereof is arranged to achieve a desired tuned circuit inductance.

Figure 6:
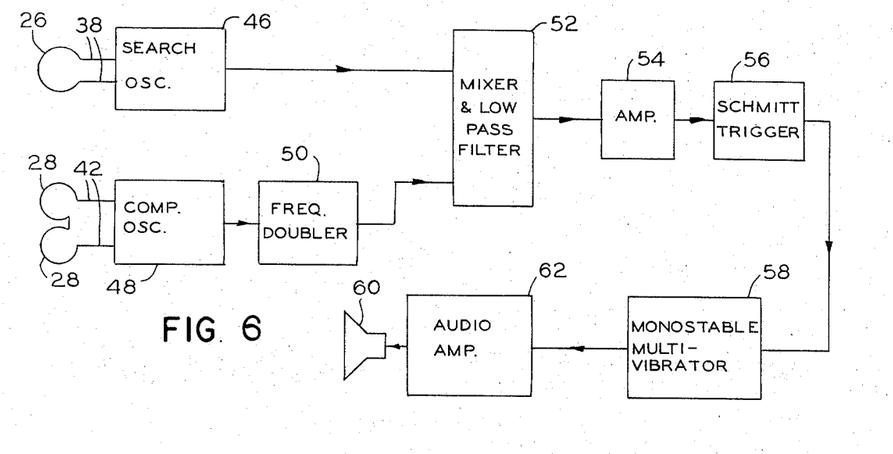
FIG. 6 is a block diagram illustrating circuitry according to the present invention.

FIG. 6 is a block diagram of a preferred circuit according to the present invention. Search coil 26 is connected via terminal leads 38 to a search oscillator 46, coil 26 comprising part of the frequency-determining tuned circuit of such oscillator. Coils 28, illustrated in simplified fashion, are coupled via terminal leads 42 to compensating oscillator 48, coils 28 forming part of the frequency-determining tuned circuit of oscillator 48. In the usual beat frequency metal detector, the search oscillator output is heterodyned with an output of a reference oscillator having a constant output frequency, and the frequencies of the search and reference oscillators are close enough to result in an audible output signal. In the present system, oscillator 48 is employed as the reference oscillator. In the FIG. 6 embodiment, the normal operating frequency of oscillator 48 is suitably half that of oscillator 46 such that lock-in between the two oscillators is avoided despite the proximity of coils 26 and 28 in the same physical assembly. Then, the output of oscillator 48 is coupled via frequency doubler 50 to mixer and low-pass filter 52, to which the output of oscillator 46 is also applied. The mixer is a nonlinear device, and produces amoung other things an output having a frequency equaling the difference of the frequencies of its input signals. A low-pass filter then selects only this difference signal which is provided as an output of block 52. Assuming the frequency of oscillator 48 is exactly half that of oscillator 46, a "zero-beat" situation will occur, and no difference frequency will be produced in mixer 52. However, location of coil 26 proximate a sought-after metal object, for example a coin or other object in the ground, will affect the frequency of the tuned circuit of which coil 26 forms a part, causing the output frequency of oscillator 46 to change, and producing a beat frequency output from mixer 52. Actually, oscillators 46 and 48 are adjustable in frequency and the operator of the apparatus may desire an initial offset in the frequency of one or the other of the oscillators so that a low beat frequency is produced even though an object is not detected. Then, when a metal object is detected, a change in the beat frequency output is produced. However, as assembly 20 is moved closer and farther away from the ground, a similar change in the operating frequencies of both oscillators will take place, resulting in no change in the beat frequency output.

The output of mixer and low-pass filter 52 is amplified by means of amplifier 54 and provided as an input to Schmitt trigger circuit 56 which in turn operates monostable multivibrator 58. The output of monostable multivibrator 58 is applied to a sound transducer 60 such as a load speaker or earphone by way of audio amplifier 62. The Schmitt trigger circuit and multivibrator are employed for changing the beat frequency output to a series of clicks at loud speaker 60. Thus, it may be desirable to set the oscillator frequencies initially so that a frequency difference of a few cycles per second occurs at mixer 52, i.e., below the normal audible frequency range. The Schmitt trigger suitably operates on rising waveforms, for instance, to provide an operating signal for setting monostable multivibrator 58 which resets itself at a predetermined short time thereafter. The result will be a click in the sound transducer for each cycle of the beat frequency signal. Of course, as the beat frequency signal increases in frequency, an audible tone will eventually result. Alternatively, the output of mixer and low-pass filter 52 or amplifier 54 can be applied directly to amplifier 62.

Figure 7:
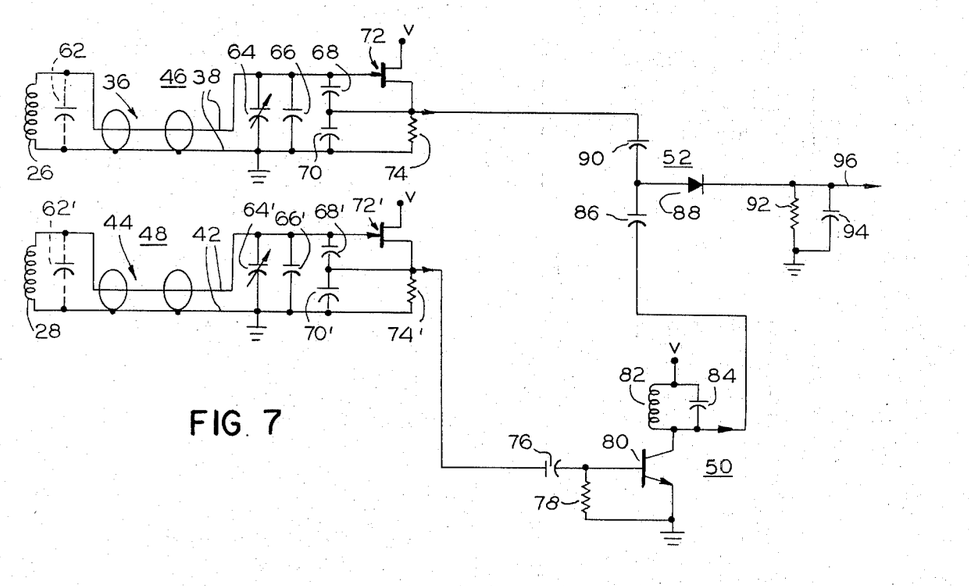
FIG. 7 is a schematic diagram further illustrating principal portions of the FIG. 6 diagram.

FIG. 7 illustrates the oscillators, frequency doubler, and mixer and low-pass filter of FIG. 6 in schematic diagram form. The oscillators are substantially identical, so oscillator 46 will be described in detail, while primed reference numerals, employed with respect to oscillator 48, refer to corresponding components. Coil 26 of oscillator 46 forms a part of a parallel tuned resonant circuit, while capacitors 62, 64 and 66 in parallel perform the function of the tank circuit capacitance. Capacitor 62 represents the stray capacitance of the coil, which is principally capacitance between the conductors of the coil and its RF shield as well as the capacitance of the interconnecting cable 36. The capacitor 64 is a small variable unit for fine tuning adjustment, while capacitor 66 is a small fixed capacitor. Capacitors 68 and 70 provide a capacitive voltage divider across the tuned circuit, while the tuned circuit terminal coupled to capacitor 68 is also connected to the gate of field effect transistor 72, the latter having source and drain terminals connected between a voltage source and the midpoint of the capacitance voltage divider in a Colpitts circuit. Resistance 74 provides a DC path for the field effect transistor current and also partly determines the amplitude of oscillations. The output of the oscillator is taken across resistor 74.

The output of oscillator 48 is coupled to frequency doubler 50 via capacitor 76, wherein the capacitor 76, and resistor 78 coupled from the output terminal of capacitor 76 to ground, form a self-regulating base current biasing circuit for NPN transistor 80. Transistor 80 has its base connected to the junction between capacitor 76 and resistor 78, its emitter grounded, and its collector returned to a positive voltage source via a parallel tuned circuit comprising inductance 82 and capacitor 84. The parallel tuned circuit 82, 84 is tuned to twice the input frequency, i.e., approximately twice the frequency generated by oscillator 48.

The collector of transistor 80 is connected to mixer and low-pass filter circuit 52 by way of coupling capacitor 86 interposed between transistor 80 and the anode of mixer or detector diode 88. Similarly, the output of oscillator 46 is coupled to the anode of diode 88 via capacitor 90. Capacitors 86 and 90 act as a capacitive voltage divider and summing circuit, and essentially the sum of the input voltages is present at the junction of the two capacitors. Diode 88 provides a detecting or mixing function, while the parallel combination of resistor 92 and capacitor 94 interposed between the cathode of diode 88 and ground forms a low-pass filter circuit across which a positive envelope is developed of the algebraically summed input voltages. On output lead 96 is supplied the beat frequency or difference frequency output signal for coupling to amplifier 54. The remainder of the circuitry, illustrated in block diagram form in FIG. 6, is well understood in the art and will not be described in detail.

By way of particular example, the normal operating frequency of oscillator 46 is suitably 1.000010 megahertz while the normal operating frequency of oscillator 48 is suitably 0.500 megahertz. Consequently, the output of frequency doubler 50 will be 1 megahertz and the beat frequency output of mixer and low-pass filter 52 will be 0.010 kilohertz. Then, when the detector is employed for detecting metal objects, the beat frequency will audibly change in response to the proximity between such an object and the search coil 26.

Briefly reviewing the overall operation of the present system it will be seen that as the apparatus as illustrated in overall fashion in FIG. 1 is moved closer to and farther away from the earth, the earth effects upon the search coil and the compensating coil will be the same and consequently the beat frequency output will remain substantially the same until a metal object or the like is detected. Such metal object will differentially affect the inductance of the coils, with the major effect being felt by search coil 26. Thus, the user can move the detector above in close proximity with the earth, and by audibly detecting changes in the frequency as he moves the coil about, he is able to locate metal objects and the like. However, merely moving the apparatus closer to and farther away from the surface of the earth will not affect the audible output frequency, due to the compensating effect of coils 28.

It is clear that a similar compensating effect can be accomplished by a single compensating coil, for example one compensating coil along side of the search coil 26, and it is understood that such embodiment is readily possible according to the present invention. However, the embodiment illustrated, employing more than one compensating coil, is preferred because of the angular error which may take place when only one compensating coil is used. Thus, when only one compensating coil 28 is employed, its compensating effect may be dependent upon the "tilt" of the device relative to the surface of the earth, i.e., whether a coil 28 or a coil 26 is closer to the ground. However, with two coils 28 employed, angular displacement relative to the ground is of no effect since one coil 28 becomes closely spaced to the ground while the other coil 28 becomes farther spaced from the ground and the net inductance of coils 28 remains the same. This, of course, assumes angular rotation about an axis bisecting the assembly housing 20 along an axis between ears 24, this being the most common axis of tilt which may occur in operating the apparatus. Moreover, each of the compensating coils can be made less sensitive to the detection of searched-for objects than if only one compensating coil were to be employed, as hereinbefore indicated.

Even though the search and compensation coils are thus relatively closely located to achieve the desired compensating effect, lock-in is avoided since the resonant frequencies of the oscillators are widely separated, with the output of one (or both) of the oscillators being converted such that a small frequency difference is subsequently generated to produce an audible output.

Figure 8:
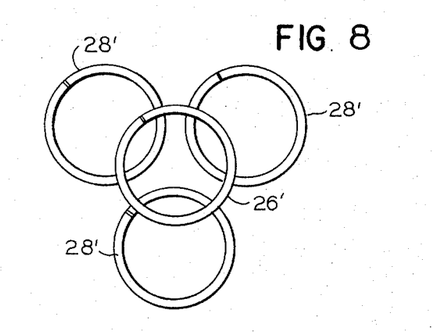
FIG. 8 is a plan view of an alternative coil assembly according to the present invention.

The construction illustrated for the preferred embodiment as hereinbefore set out can be varied within the scope of the present invention. Clearly the coils need not be of any particular shape although flat spiral coils are preferred. The coils need not be round but can be square, triangular, hexagonal, or the like. Two compensating coils and a search coil are preferred, but as hereinbefore indicated, only one search coil and one compensating coil may be employed, or alternatively one search coil may be employed with more than two compensating coils. A possible alternative configuration is illustrated by way of example in FIG. 8 wherein one search coil 26' is employed, with three compensating coils 28' being disposed in overlapping relation and equi-spaced around search coil 26. This particular configuration has the advantage of being less sensitive to tilt in various directions.

Figure 9:
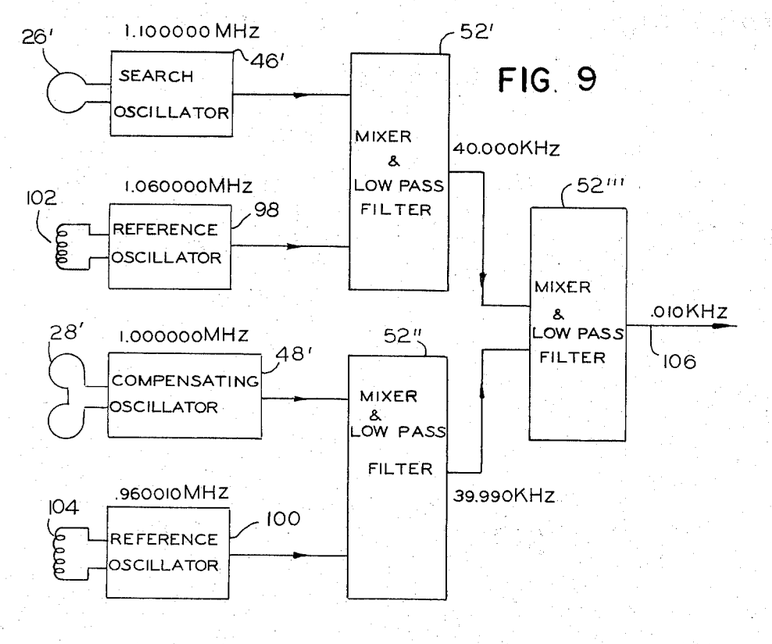
FIG. 9 is a block diagram of alternative circuitry according to the present invention.

Although the frequency doubling circuit of FIG. 6 is preferred because of its simplicity in separating the oscillator frequencies, other circuits may be substituted therefor, with one example being illustrated in FIG. 9. In this figure similar elements are referred to employing primed reference numerals corresponding to components in the FIG. 7 block diagram. In the FIG. 9 circuit, a reference oscillator 98 provides an output for mixing with the output of oscillator 46' in a mixer and low-pass filter 52'. Also, a reference oscillator 100 is utilized for providing an output for mixing with the output of oscillator 48' in mixer and low-pass filter 52''. The reference oscillators 98 and 100 may be substantially identical to the oscillator circuit hereinbefore described, except for employing tuned circuit reference coils 102 and 104 respectively which are substantially isolated from the rest of the system, i.e., not located within the coil assembly housing. The mixer and low-pass filter circuits 52' and 52'' are identical to this type of circuit previously described, and provide outputs for mixing in mixer and low-pass filter circuit 52''' which is also substantially similar in circuit construction to the mixer and filter circuitry hereinbefore described. In the particular example, the search oscillator 46' is designed to have an operating frequency of 1.1 megahertz while reference oscillator 98 has an operating frequency of 1.06 megahertz. It will be seen that the output of mixer and low-pass filter 52' will be a difference frequency equaling 40 kilohertz. Furthermore, the oscillator 48' is suitably designed to have an operating frequency of 1 megahertz while reference oscillator 100 has an operating frequency of 0.960010 megahertz. Mixing these two signals in mixer and low pass filter circuit 52'' results in an output signal having a frequency of 39.990 kilohertz. Then, a mixture of the outputs from circuits 52' and 52'' in circuit 52''' will produce a signal having an output frequency of 0.010 kilohertz on lead 106, i.e., a frequency difference in the audio range. However, the frequencies of the search oscillator 46' and the compensating oscillator 48' are sufficiently widely separated in frequency to avoid lock-in.

While I have shown and described several embodiments of my invention, it will be apparent to those skilled in the art that many other changes and modifications may be made without departing from my invention in its broader aspects. I therefore intend the appended claims to cover all such changes and modifications as fall within the true spirit and scope of my invention.

I claim:

1. Apparatus for detecting metal objects comprising:

first oscillator means provided with a first tuned circuit adapted for determining the resonant frequency of operation of said first oscillator means, said first tuned circuit including a first coil,
   second oscillator means provided with a second tuned circuit adapted for determining the resonant frequency of operation of said second oscillator means, said second tuned circuit including a a plurality of second coils, the frequency of the second oscillator means being separated by a sufficient amount from the frequency of the first oscillator means to avoid lock-in to the same frequency,
   means for receiving an output from said first oscillator means and from said second oscillator means and for combining the two to provide a beat frequency output component which varies in accordance with changes in the output frequency of one of said oscillators relative to the other,
   and manually movable common support means for supporting said first coil and said second coils in close proximity but on offset axes while similarly orienting said coils for concurrent movement toward and away from the ground, and relative to a region where metal is to be detected so that both of said coils and therefore the frequencies of both of said oscillators are similarly affected by surface effects and overall environmental factors in the region where metal is to be detected while being differentially affected by metal objects in closer proximity to one of said coils,
   said coils being of comparable diameter while being located in relatively close proximity to and substantially parallel to the same plane by said support means.

2. The apparatus according to claim 1 wherein the axes of said coils are substantially parallel to one another.

3. The apparatus according to claim 1 wherein said coils are substantially flat.

4. The apparatus according to claim 3 wherein said coils are disposed in overlapping relation and in closely spaced substantially parallel planes.

5. The apparatus according to claim 1 wherein one of said coils comprises two interconnected coil parts having separate axes with said coil parts being located on either side of the remaining of said coils such that angular orientation of said common support means with respect to a horizontal surface disposes one of said coil parts in closer relation to said horizontal surface than the other coil part for balancing the effect of the angular orientation of said common support means relative to said horizontal surface.

6. The apparatus according to claim 1 wherein the normal frequencies of operation of said oscillators are widely separated to prevent interaction between said coils on said common support means which would cause an interrelation between the frequencies of operation of said oscillator means due to the coupling between said coils, and means interposed between at least one of said oscillator means and said means for receiving the oscillator means outputs for changing the frequency of the output of said one of said oscillator means to a signal having a relatively small frequency difference from the output of the remaining oscillator means, adapting said means for receiving oscillator means outputs to provide a beat frequency output in a predetermined frequency range.

7. The apparatus according to claim 6 wherein said interposed means comprises a frequency multiplying means for multiplying the frequency of one of said oscillator means to a frequency having said relatively small frequency difference relative to the frequency of the remaining oscillator means.

8. The apparatus according to claim 6 wherein said interposed means includes an additional oscillator having an output mixed with the output of one of said oscillator means.

9. The apparatus according to claim 6 wherein said interposed means includes additional oscillator means for producing outputs mixed with the outputs of the first and second oscillator means.

10. Apparatus for detecting metal comprising:
a first oscillator having a tuned circuit including a search coil adapted to be influenced in its inductive properties by the proximity of metal objects,
a second oscillator also having a tuned circuit, wherein an output derived therefrom is used in combination with an output derived from first oscillator for providing an audible indication, the frequency of the second oscillator being separated by a sufficient amount from the frequency of the first oscillator to avoid lock-in to the same frequency, manually movable support means for carrying said search coil so the search coil may be conveniently moved relative to the ground or other environment by the operator of the apparatus,
and a plurality of second coils also supported by the same support means and connected in the tuned circuit of said second oscillator for causing said second oscillator to be influenced in its frequency in the same manner as the first oscillator is influenced in frequency by proximity of the search coil to the ground surface or the like,
said search coil and said second coils being of comparable diameter while being supported in relatively close spaced relation to each other and to the same plane by said support means.

11. The apparatus according to claim 10 wherein said plurality of second coils are symmetrically disposed with respect to said search coil so that angular disposition of said support means with respect to the ground is compensated by closer spacing of a second coil on one side of said search coil with respect to the ground and more remote spacing of a second coil on another side of the search coil with respect to the ground.

12. The apparatus according to claim 10 wherein said second coils are connected in series in the tuned circuit of said second oscillator.

13. The apparatus according to claim 10 wherein said tuned circuits of said oscillators are more widely separated in the frequency to which they are normally tuned than would produce an audible beat frequency therebetween, and including means for converting the output of at least one of said oscillators to a frequency close enough to the frequency of an output derived from the remaining oscillator to produce an audible beat frequency.

14. Apparatus for detecting metal objects comprising:
first oscillator means provided with a first tuned circuit adapted for determining the resonant frequency of operation of said first oscillator means, said first tuned circuit including a search coil,
second oscillator means provided with a second tuned circuit adapted for determining the resonant frequency of operation of said second oscillator means, said second tuned circuit including an inductive frequency determining element,
wherein the tuned circuits of said oscillators are more widely separated in the frequency to which they are normally tuned than would produce an audible beat frequency therebetween,
means for converting the output of at least one of said oscillator means to a frequency close enough to the frequency of an output derived from the remaining oscillator means to produce an audible beat frequency therebetween,
means for receiving outputs derived from the first and second oscillator means after said conversion and for combining the two to provide an audible beat frequency output component which varies in accordance with changes in the output frequency of one of said oscillator means relative to the other, and common support means for said search coil and said inductive frequency determining element adapted for moving said search coil and said inductive frequency determining element relative to a region where metal is to be detected so that the frequencies of both said oscillator means are similarly affected by surface effects and overall environmental factors in the region where metal is to be detected while being differentially affected by metal objects in closer proximity to said search coil, said search coil and said inductive frequency determining element being supported in relatively close spaced relation to each other and to the same plane by said support means.

15. The apparatus according to claim 14 wherein said converting means comprises a frequency multiplying means for multiplying the frequency of one of said oscillator means to a frequency having a relatively small frequency difference relative to the frequency of the remaining oscillator means.

16. The apparatus according to claim 14 wherein said converting means includes an additional oscillator having an output mixed with the output of one of said oscillator means.

* * * * *

UNITED STATES PATENT OFFICE
CERTIFICATE OF CORRECTION

Patent No. 3,823,365            Dated July 9, 1974

Inventor(s) Sherman D. Anderson

It is certified that error appears in the above-identified patent and that said Letters Patent are hereby corrected as shown below:

In the references, the subclass for Speaker, "3X" should be --3XR--.

Column 1, line 66, "different" should be --differential--.

Column 3, line 11, "lockout" should be --locknut--.

Column 7, line 11, after "becomes" insert --more--.

Column 8, line 38, "a a" should be --a--.

Signed and sealed this 3rd day of December 1974.

(SEAL)
Attest:

McCOY M. GIBSON JR.
Attesting Officer

C. MARSHALL DANN
Commissioner of Patents